April 29, 1924.
J. S. LANG
SHOCK ABSORBER
Filed Sept. 24, 1921
1,492,328
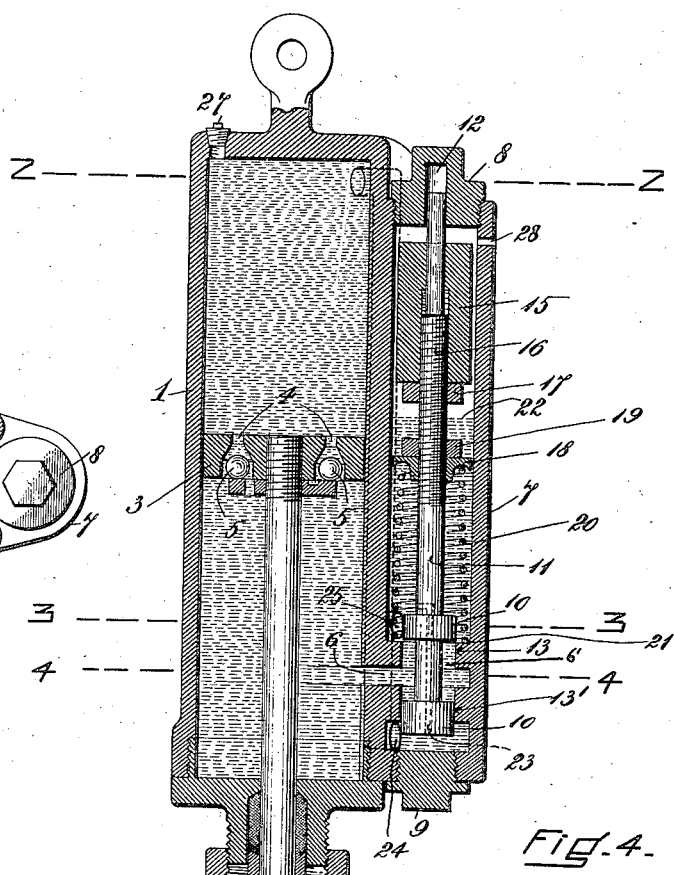
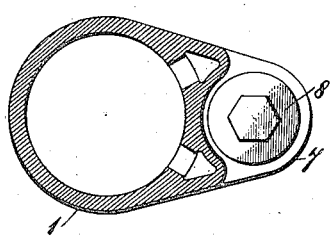
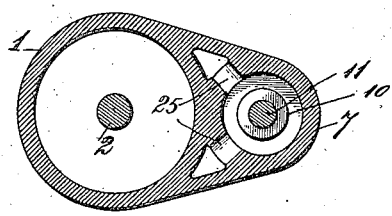
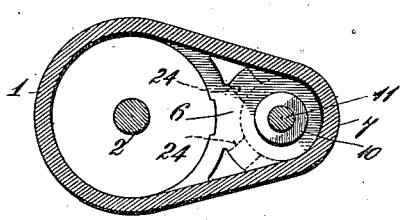
INVENTOR:
James S. Lang
BY
ATTORNEYS:

Patented Apr. 29, 1924.

1,492,328

UNITED STATES PATENT OFFICE.

JAMES S. LANG, OF WATERTOWN, MASSACHUSETTS.

SHOCK ABSORBER.

Application filed September 24, 1921. Serial No. 502,954.

*To all whom it may concern:*

Be it known that I, JAMES S. LANG, of Watertown, in the county of Middlesex and State of Massachusetts, a citizen of the United States, have invented a new and useful Improvement in Shock Absorbers, of which the following is a full, clear, and exact description, reference being had to the accompanying drawings, forming a part of this specification, in explaining its nature.

The present invention relates to that class of shock absorbers in which the shock or excessive vibration of a vehicle body is lessened by the force required to pass a fluid through a constricted passage by means of a piston or similar device.

The essential object of the invention is to provide a means of automatically varying the area of the part or passage through which the fluid is forced, and therefore the amount of force brought into play whenever such variation in the amount of force is required to effectually check the vibration or rebound of the vehicle body.

A shock absorber embodying my invention can be seen by reference to the drawings, in which—

Figure 1 shows a vertical section thereof.

Fig. 2 is a cross section on line 2—2 of Fig. 1.

Fig. 3 is a cross section on line 3—3 of Fig. 1.

Fig. 4 is a cross section on line 4—4 of Fig. 1.

Referring to the drawings:—

1 represents a cylinder attachable by any suitable fittings to the framework of a vehicle body. 2 is a piston rod attachable to the axle of the vehicle in the usual manner, with the axis of both cylinder and rod in an approximately vertical position.

Carried by the piston rod is a piston 3 which slides with a close fit in the cylinder and is provided with passages 4 through it controlled by check valves 5, ball checks being preferably provided. The cylinder is filled, both above and below the piston, with oil, and the arrangement of the valves is such that when the piston is moved toward the upper end of the cylinder the oil will pass freely through the piston, and when the piston is moved downward from the upper end, the check valves close and the oil is forced from the lower end of the cylinder constituting a pressure chamber, by way of a constricted passage 6 which communicates with the interior of an auxiliary casing 7 on the side of the cylinder through a port 6'. The casing 7 is closed at the top by a cover cap 8 and at the bottom by a lower cover cap 9.

Located within the casing 7 is a vertically movable valve 10 which controls the port 6'. This valve is preferably of the double disk balanced type opening and closing under pressure without undue resistance. It is open when the valve is raised and closed when it is lowered.

The valve 10 is carried by a spindle 11 of considerable length. The upper end of the spindle is slidably retained in position by a socket 12 in the cover cap 8 while the valve itself is held against lateral displacement by cylindrical seats 13, 13' against which its respective disks have bearing.

The valve spindle 11 carries near its upper end a pilot weight 15 which may be raised or lowered on the spindle by turning on a threaded portion 16 thereof, and locked in its proper position by a locknut 17 bearing against the lower end of the weight. The upward travel of the valve 10 is limited by the upper end of the pilot weight 15 coming in contact with the under side of the cover cap 8 in which position the valve is wide open. The downward travel of the valve is limited by its lower end coming in contact with the lower cover cap 9 in which position the valve is closed.

The valve spindle also carries on its threaded portion below the pilot weight an adjustable spring retainer 18 which may be adjusted to its proper height by turning and there locked in position with a locknut 19. Engaging the spring retainer 18 on its under side is a supporting spring 20 with its lower end resting upon a suitable footing 21 inside the casing 7. Thus arranged the spring carries the combined weight of the control valve 10, its valve spindle and the pilot weight.

The valve is adjustably positioned by turning the spring retainer 18 up or down upon the spindle until it is in such position that when replaced in the casing the compression of the spring will support the pilot weight, spindle and valve at such a height that the valve is very slightly open, the working edges of the valves and its seat 13 being nearly line and line, or in such a position that a slight raising of the valve will open it, and a slight lowering of the valve will close it. The valve thus positioned is in a state of substantial balance and will be undisturbed by the pressure entering by way of the outlet from the cylinder chamber inasmuch as the pressure is exerting its influence substantially equally on the opposite faces to the respective disks of the valve.

The cylinder space above and below the piston 3 is filled with oil. The casing 7 is also filled with oil about half full, the level being indicated at 22, the casing thus forming an oil reservoir. The space below the valve seats and the space directly above them are connected by a passage 23 through the valve and also connected, respectively, by cored passages 24 and 25 with the upper end of the cylinder. This arrangement permits the passage of oil into the upper end of the cylinder when the piston is moved downward and the valve 10 is open.

The cylinder is also provided with a filling plug 27 by which the absorber may be filled with oil. In order that the level of oil in the casing 7 may freely rise and fall an air vent 25 is provided.

The operation of the device is as follows: In its normal position with the shock absorber cylinder flexibly attached to the vehicle body, and the lower end of the piston rod 2 flexibly attached to the axle of the vehicle, the piston occupies the middle portion of the cylinder, so as to provide space in which it can move in either direction. The oil in the upper end of the cylinder is in free communication with the lower end of the oil reservoir in the auxiliary casing by means of the passages 24, 25 and may freely pass through the valves in the piston to the pressure chamber on the lower side of the piston. The oil below the piston is prevented from passing through the piston by reason of the check valves therein, and can only pass to the oil reservoir in the auxiliary casing through the almost tightly closed control valve 10.

The weighted valve is supported by a relatively light spring such that when displaced from its normal position it has preferably though not necessarily a rate of vibration not faster than the rate of vibration of the vehicle body upon its springs, the rate in both cases being dependent upon the inertia of their masses and the stiffness of the springs supporting them.

We will now suppose the vehicle in its travel to encounter a raised obstruction of considerable width in the roadway, sufficient under ordinary circumstances to produce a violent rebound.

As the wheels strike the rise, the axle attached to the piston rod pushes the piston toward the upper end of the cylinder, the oil above the piston passing freely through the check valves therein to the space below it, and at the same time the vehicle springs are compressed beyond their normal and the vehicle body rises slightly in response to such compression.

The weighted valve tends by reason of its inertia to travel in the same straight line, and does not rise as rapidly or as soon as the vehicle body and the absorber attached thereto and the valve 10 is consequently closed. As the wheels pass the crest of the rise the vehicle springs are very heavily compressed, and would if it were not for the action of the absorber project the body of the vehicle violently upward. The weighted valve, however, still lagging in its rise behind the rise of the vehicle body remains closed, and the pressure of the springs is exerted upon the fluid below the piston, and they are thereby prevented from expanding with a resultant toss of the vehicle body. As the wheels pass down the other side of the rise, the vehicle body is slightly higher than it was before striking the rise, and begins to fall slightly. The weighted valve, however, still on its upward travel, reaches its normal position in its casing, and passing beyond it by reason of its inertia, opens thereby, releasing the oil below the piston and allowing the piston to move downward, and consequently the wheels to maintain contact with the roadway in the virtual hollow on the after side of the rise and supporting the body at its normal level. During the downward travel of the piston the oil passes out through the outlet passage 6 and port 6', through the opened valve 10, upward by way of cored passages 24, 25, and into the cylinder space above the piston.

It is therefore seen that the effect of the operating parts just described, on the passage of the vehicle over a raised obstruction are: that on the rise of the obstruction the vehicle springs are compressed without excessive rise of the vehicle body; that across the crown of the rise the springs are held in a state of compression and prevented from projecting the body upward; that on the downward after slope of the rise the springs are released and allowed to resume their position occupied previous to striking the obstruction; all without excessive variation of the vehicle body from its normal level of travel.

When the vehicle passes an inequality the reverse of the preceding, viz: a deep hollow of considerable width in the roadway, the following action takes place: The vehicle approaches the hollow with the vehicle springs, piston, weighted valve in their respective normal positions. As the wheels pass down the incline into the hollow, the lift of the vehicle springs is decreased and the vehicle body falls slightly from its normal level. The weighted valve, however, on account of its inertia, lags in its fall behind the fall of the vehicle body and the valve is instantly opened. The instant opening of the valve permits the oil below the piston to freely flow through the passage 6 and port 6', by the control valve 10 and through the passages 24, 25 to the upper side of the piston, which allows the piston to move freely downward, and the vehicle springs to expand above their normal state of compression, thus maintaining the vehicle body at nearly its former level. As the wheels pass the horizonal bottom of the hollow, the valve is still open on its way toward closing and the vehicle springs remain expanded maintaining the body well up in position. The wheels now strike the rise on the opposite side of the hollow and the vehicle springs are again compressed to above their normal tension, the piston passing freely upward in the cylinder and the further fall of the vehicle body is checked. As the wheels reach the level of the roadway on the latter side of the hollow the springs now compressed beyond their normal begin to move the vehicle body upward on an incipient rebound. At this time, however, the weighted valve, lagging in its downward path behind the fall of the vehicle body, closes and the oil is retained in the lower part of the cylinder, thereby holding the vehicle springs in their compressed state and preventing the rebound, which would otherwise have taken place on regaining the roadway level. As the weighted valve returns to its normal position the control valve reopens and the vehicle springs regain their normal state of compression and the vehicle body its normal level upon the roadway beyond the depression.

It is therefore seen that the effect of the actions of the operating parts just described on the passage of the vehicle over a depression in the roadway are: That on the downward incline the vehicle springs are expanded beyond their normal without interference of the absorber and without excessive fall of the vehicle body; that in passing the lowest part of the depression the vehicle springs remain in their expanded condition, maintaining the vehicle body at the highest possible level; that on the upward incline on the after side of the depression the vehicle springs are compressed again to beyond their normal state of compression without interference of the absorber; that on reaching the level of the roadway the springs are prevented from expanding above their normal and thus projecting the vehicle body upward; all without excessive variation of the vehicle body from its normal level of travel.

In general, therefore, on all types of road inequalities the action of the device is such that the vibrations and rebounds of the car body are dampened and eliminated by the instant opposition of the absorber piston to the force of the vehicle springs, brought about whenever any tendency to vibrate or rebound develops, through the operation of the weighted valve actuated automatically by the inertia of this valve.

As before explained, the invention is shown applied to a typical shock absorber having a cylindrical piston and completely filled with liquid, but it is, however, equally applicable to any absorber in which the force required to pass a fluid through a restricted part, passage or valve is opposed to the vehicle springs for the prevention of rebound or vibration, and its arrangement may be varied to suit the design of the particular absorber in connection with which it is used.

Having thus fully described my invention, I claim and desire to secure by Letters Patent of the United States:—

1. A fluid check shock absorber for controlling the movement of relatively movable parts comprising an element attachable to one of said parts and having a fluid-containing pressure chamber, a movable piston attachable to the other of said parts and reciprocable within said pressure chamber, said pressure chamber having an outlet therefrom on one side of said piston and otherwise provided with means of communication between said outlet and the pressure chamber on the other side of the piston and consisting in part of a controllable port, a weighted valve for controlling said port and the passage of fluid therethrough, means for supporting said weighted valve to occupy normally a substantially balanced position whereby the weighted valve will automatically be influenced to control said port by its inertia, and means whereby said piston will pass with substantial freedom through said pressure chamber in a general direction away from said outlet and be restricted in its passage therethrough when moved in the general direction of said outlet.

2. A fluid check shock absorber for controlling the movement of relatively movable parts comprising an element attachable to one of said parts and having a fluid-containing cylinder casing and an auxiliary casing, a movable piston attachable to the other of said parts and reciprocable within said cylinder casing, said attachable element having an outlet from said cylinder casing on one side of said piston and opening into said auxiliary casing and beyond said outlet a port in said auxiliary casing and other means forming communication between the chamber of said auxiliary casing and the chamber of said cylinder casing on the opposite side of said piston from said outlet, a weighted valve within said auxiliary casing for controlling said port and the passage of fluid therethrough, means for supporting said weighted valve to occupy normally a substantially balanced position whereby said weighted valve will automatically be influenced to control said port by its inertia, and means whereby said piston will pass with substantial freedom through the chamber of said cylinder casing in a general direction away from said outlet and be restricted in its passage therethrough when moved in the general direction of said outlet.

JAMES S. LANG.